(12) United States Patent
Peltomaa et al.

(10) Patent No.: US 12,331,638 B1
(45) Date of Patent: Jun. 17, 2025

(54) CONTROLLING A TRACK-MOUNTED DRILL RIG

(71) Applicant: SANDVIK MINING AND CONSTRUCTION OY, Tampere (FI)

(72) Inventors: Toni Peltomaa, Tampere (FI); Mika Sahlman, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 18/539,392

(22) Filed: Dec. 14, 2023

(51) Int. Cl.
  *E21B 7/02* (2006.01)
  *E21B 15/04* (2006.01)
  *E21B 44/00* (2006.01)

(52) U.S. Cl.
  CPC .......... *E21B 7/022* (2013.01); *E21B 15/045* (2013.01); *E21B 44/00* (2013.01)

(58) Field of Classification Search
  CPC .......... E21B 7/02; E21B 7/022; E21B 15/045; E21B 44/00
  See application file for complete search history.

(56) References Cited

U.S. PATENT DOCUMENTS

| | | | |
|---|---|---|---|
| 2012/0024605 A1 | 2/2012 | Elinas et al. | |
| 2012/0179322 A1 | 7/2012 | Hennessy et al. | |
| 2014/0110168 A1* | 4/2014 | Pursimo | E21B 7/025 701/50 |
| 2020/0308914 A1* | 10/2020 | Haverinen | E21B 7/024 |

FOREIGN PATENT DOCUMENTS

CA 3118408 A1 6/2020

OTHER PUBLICATIONS

Ting et al: "Dynamic modeling and trajectory tracking control of unmanned tracked vehicles—ScienceDirect", Robotics and Autonomous Systems, vol. 110, Dec. 1, 2018, pp. 102-111, Amsterdam, NL.

* cited by examiner

*Primary Examiner* — Dany E Akakpo
(74) *Attorney, Agent, or Firm* — Corinne R. Gorski

(57) ABSTRACT

An apparatus includes at least one processor and at least one memory including computer program code. The at least one memory and the computer program code configured to, with the at least one processor, cause the apparatus at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

16 Claims, 5 Drawing Sheets

CONTROLLING A TRACK-MOUNTED DRILL RIG

TECHNICAL FIELD

Various example embodiments generally relate to the field of controlling track-mounted drill rigs. Some example embodiments relate to controlling alignment of the drill bit of a track-mounted drill rig with a target position of the drill bit.

BACKGROUND

In various fields of technology, such as for example rock drilling, it may be desired to automatically control movement of vehicles. For example, it may be desired to automatically control movement of a drill rig such that the drill rig is enabled to drill holes at planned positions of a drilling surface.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, an apparatus for controlling a track-mounted drill rig is disclosed. The apparatus may comprise: at least one processor; and at least one memory including computer program code, the at least one memory and the computer program code configured to, with the at least one processor, cause the apparatus at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

According to a second aspect, a track-mounted drill rig is disclosed. The track-mounted drill rig may be configured to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

According to a third aspect, a method for controlling a track-mounted drill rig is disclosed. The method may comprise: determining a target position for a drill bit of the track-mounted drill rig; determining a turning trajectory of an aiming point of the drill bit; monitoring position of the turning trajectory of the aiming point of the drill bit with respect to the target position of the drill bit during approach of the track-mounted drill rig to the target position; and causing turning of the track-mounted drill rig to align the aiming point of the drill bit with the target position of the drill bit based on determining that the turning trajectory of the aiming point of the drill bit substantially coincides with the target position of the drill bit.

According to a fourth aspect, an apparatus is disclosed. The apparatus may comprise: means for determining a target position for a drill bit of the track-mounted drill rig; means for determining a turning trajectory of an aiming point of the drill bit; means for monitoring position of the turning trajectory of the aiming point of the drill bit with respect to the target position of the drill bit during approach of the track-mounted drill rig to the target position; and means for causing turning of the track-mounted drill rig to align the aiming point of the drill bit with the target position of the drill bit based on determining that the turning trajectory of the aiming point of the drill bit substantially coincides with the target position of the drill bit.

According to a fifth aspect, a computer program, a computer program product, or a (non-transitory) computer-readable medium is disclosed. The computer program, computer program product, or (non-transitory) computer-readable medium may comprise program instructions which, when executed by an apparatus, cause the apparatus at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

Example embodiments of the above aspects are described in the claims, the description, and/or the drawings. According to some aspects, there is provided the subject matter of the independent claims. Some further aspects are defined in the dependent claims. Many of the attendant features will be more readily appreciated as they become better understood by reference to the following description considered in connection with the accompanying drawings.

BRIEF DESCRIPTION OF DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DESCRIPTION

Reference will now be made to embodiments, examples of which are illustrated in the accompanying drawings. The description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
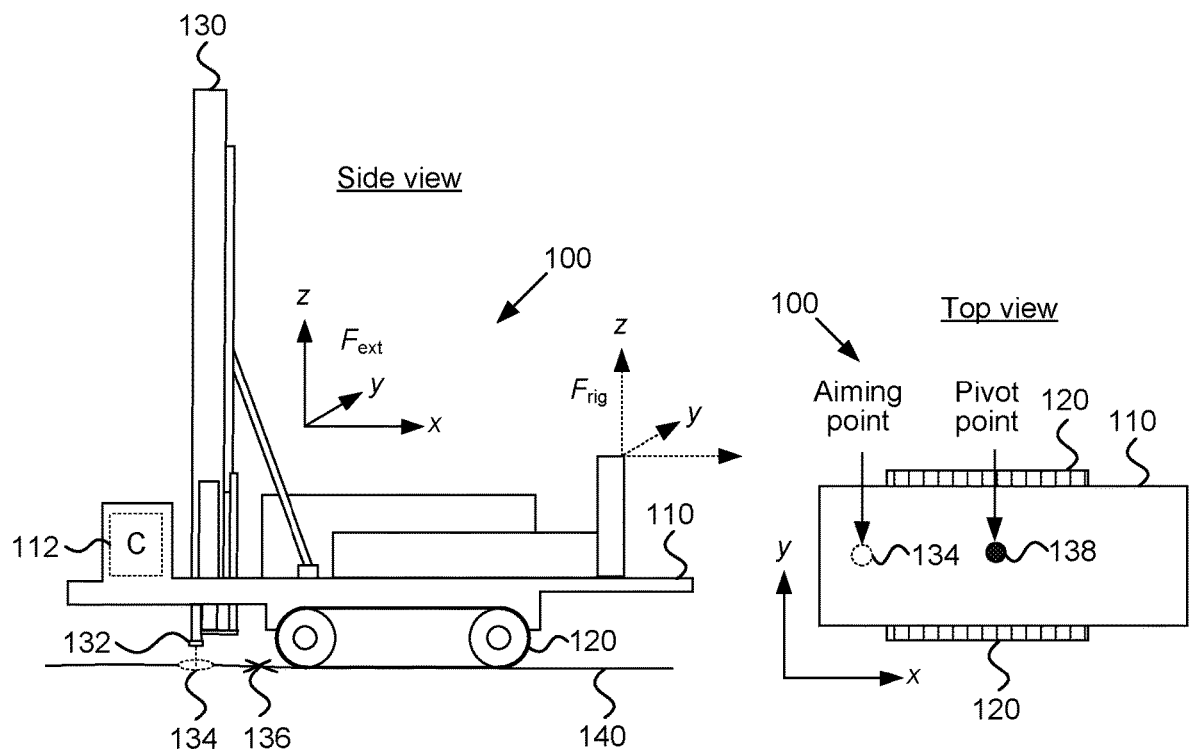
FIG. 1 illustrates an example of a track-mounted drill rig.

FIG. 1 illustrates side and top views of an example of a track-mounted drill rig. Even though track-mounted drill rig 100 is illustrated as a rotary blasthole drill rig, example embodiments of the present disclosure may be also applied to other type of track-mounted drill rigs, such as for example any suitable type of surface drill rigs or underground drill rigs.

Track-mounted drill rig 100 may be an automated drill rig or a semi-autonomous drill rig, for example a remote-controlled drill rig. An automated drill rig may be equipped with tools configured for certain task(s), for example drilling. An automated drill rig operating in an automatic mode may be configured to, for example, receive a task to be performed, perceive the environment of the automated drill rig, and autonomously perform the task while taking the environment into account. An automated drill rig operating in an automatic mode may be configured to operate independently but may be taken under external control by a human operator at certain operation areas or conditions, such as during states of emergencies.

Track-mounted drill rig 100 may comprise movable carrier 110 and mast 130. Track-mounted drill rig 100 may comprise controller 112, which may be configured to control various operation of track-mounted drill rig 100, for example tramming or drilling. As another example, the orientation of mast 130 may be controlled by controller 112, for example to place mast 130 in a suitable orientation for drilling or for moving the drill rig to another location, e.g., towards a next hole. For example, controller 112 may be configured to control the inclination angle of mast 130. The inclination angle may comprise an angle between mast 130 and a vertical axis (z). The vertical axis (z) may be parallel to the vector of gravity and/or perpendicular to drilling surface 140. It is however noted that any other suitable measure of mast inclination may be applied.

Track-mounted drill rig 100 may comprise tracks 120, which may be connected to movable carrier 110. Movable carrier 110 may comprise equipment for moving or stabilising the drill rig, such as for example a motor or stabilizer jacks. Even though two tracks 120 have been illustrated in FIG. 1, track-mounted drill rig 100 may in general comprise a plurality (e.g., two, four, . . . ) of tracks 120. Track-mounted drill rig 100 may comprise one or more of the parts described above, or other tool(s) or equipment relevant for a track-mounted drill rig.

Track-mounted drill rig 100 may comprise a drilling unit, which may be couped to mast 130. The drilling unit may comprise equipment for drilling holes in drilling surface 140. The drilling unit may for example comprise a drill rod and a feed beam configured to enable drill bit 132 to be applied to drilling surface 140 in order to drill a hole. Aiming point 134 of drill bit 132 may be configured to indicate a position to which drill bit 132 would be applied from the current position of track-mounted drill rig 100. Aiming point may be associated with a particular configuration (e.g., inclination angle) of mast 130. Aiming point 134 may comprise a projection of the current position of drill bit 132 to drilling surface 140, for example in the direction of movement of drill bit 132 with the current inclination angle of mast 130. Aiming point 134 may be configured to indicate a projected position of drill bit 132 with a desired angle to a certain level (e.g., drill plan level), for example after completing a levelling procedure. The drill plan level may comprise a level, at which the planned holes reside in a drilling plan. Aiming point 134 may comprise a position on, or relative to, drilling surface 140. For example, aiming point 134 may comprise a position on a three-dimensional (3D) model of drilling surface 140 or a position on a two-dimensional (2D) representation (e.g., a map) of drilling surface 140.

Track-mounted drill rig 100 may be configured to operate according to a drilling plan. The drilling plan may be configured to indicate target position(s) 136 for drill bit 132 for drilling hole(s) to drilling surface 140. A target position of drill bit 132 may comprise a start position of a hole planned to be drilled on drilling surface 140. Similar to aiming point 134, target position 136 of drill bit 132 may comprise a target position of drill bit 132 on, or relative to, drilling surface 140.

The drilling plan may further comprise end point(s) of the hole(s), for example in case of inclined holes that are planned to be drilled with a non-zero inclination angle. Characteristics of inclined holes may be however defined in any suitable manner, for example by a combination of the start point, a direction of the inclined hole on drilling surface 140, and an inclination angle of the inclined hole.

The drilling plan may comprise a digital drilling plan. Track-mounted drill rig 100 may be preconfigured with the drilling plan. The drilling plan may be for example stored in a memory of track-mounted drill rig 100 or controller 112. Controller 112 may be configured to obtain the drilling plan by retrieving it from the memory. Alternatively, controller 112 may be configured to obtain the drilling plane by receiving it from a remote device, e.g., a server, or via a user interface.

Track-mounted drill rig 100 may comprise a pivot point 138. Pivot point 138 may be a point of track-mounted drill rig 100, around which track-mounted drill rig 100 rotates, or is estimated to rotate, when it is turning. Pivot point 138 may comprise a point of track-mounted drill rig 100 whose tangent has the same direction as the heading of track-mounted drill rig 100 when track-mounted drill rig 100 is turning. A tangent of a point of track-mounted drill rig 100 may comprise a tangent of a trajectory of the point during movement (e.g., turning) of track-mounted drill rig 100. The heading of track-mounted drill rig 100 may comprise a direction in which track-mounted drill rig 100 would move, if tramming straight forward or backward from its current position. Note that track-mounted drill rig 100 may be configured to turn with or without non-rotational transition with respect to drilling surface 140. For example, when controller 112 causes tracks 120 to roll at opposite directions with same speed, track-mounted drill rig 100 may be caused to rotate around its central vertical axis without non-rotational transition with respect to drilling surface 140.

Controller 112 may be configured to estimate a position of pivot point 138 by various means. One approach is to calculate heading history of several pivot point candidates located at different positions on track-mounted drill rig 100, record the heading history of track-mounted drill rig 100, and to select the pivot point candidate that has the minimum average heading error to the heading of track-mounted drill rig 100. The heading error may comprise the difference between the heading of the candidate pivot point (e.g., the tangent of the candidate pivot point) and the heading of track-mounted vehicle 100. The heading error may be calculated at different time instants during turning of track-mounted vehicle 110 and averaged to estimate the position of pivot point 138.

Another possible approach is to determine a default pivot point, for example corresponding to the pivot point when track-mounted drill rig 100 is turning without non-rotational transition with respect to drilling surface 140. In this case, the default pivot point comprises a point of track-mounted drill rig 100, around which track-mounted drill rig 100 rotates when it is not moving in a forward or backward direction. The default pivot point may be therefore stationary with respect to drilling surface 140 when rotating track-mounted drill rig 100 by moving tracks 120 in opposite directions with the same speed.

Controller 112 may be configured to determine the position of pivot point 138 by adjusting the position of the default pivot point. For example, controller 112 may be configured to adjust the position of the default point towards the driving direction (e.g., forward or backward) of track-mounted drill rig 100 to determine pivot point 138. Controller 112 may be therefore configured to estimate the position of pivot point 138, for example by applying a predetermined offset to the default pivot point towards the driving direction.

In general, controller 112 may be configured to adjust the default pivot point based on physical, operational, or environmental characteristics, which affect movement control of track-mounted drill rig 100. For example, controller 112 may be configured to determine a physical or operational configuration of track-mounted drill rig 100, or current driving conditions of track-mounted drill rig 100. Physical characteristics affecting movement control of track-mounted drill rig 100 may comprise for example the mass or current position of mast 130. The operational characteristics may comprise the driving direction of track-mounted drill rig 100. Environmental characteristics may comprise for example a type of drilling surface 140, for example whether drilling surface 140 is rock, sand, or snow. The above characteristics may affect the interaction between tracks 120 and drilling surface 140 and therefore they may also affect movement control of track-mounted drill rig 100 and therefore the estimation of the position of pivot point 138. Pivot point 138 may be defined in a coordinate frame of track-mounted drill rig 100 ($F_{rig}$). This coordinate frame may be stationary with respect to track-mounted drill rig 100.

Controller 112 may be provided as a software application residing on a memory and being executable by a processor. An example of an apparatus suitable for implementing controller 112 is provided in FIG. 8. Controller 112 may comprise, or be communicatively coupled to, various functions, blocks, or applications for implementing functionality of controller 112. For example, controller 112 may comprise or be communicatively coupled to a data management server, which may be configured to store information on functions to be performed by track-mounted drill rig 100, the drilling plan, tunnel lines, point cloud or mesh presentations of tunnel lines or profiles, a mine map point cloud, or the like; or in general representation(s) of the working environment of track-mounted drill rig 100.

Controller 112 may comprise a navigation application configured to control, or enable a human operator to control, navigation of track-mounted drill rig 100, for example to move track-mounted drill rig 100 to reach a next target position of drill bit 132. A position of track-mounted drill rig 100 may be referred to as a navigation position. The navigation position may be provided with respect to the external coordinate frame ($F_{ext}$), which may be stationary with respect to drilling surface 140.

Figure 2:
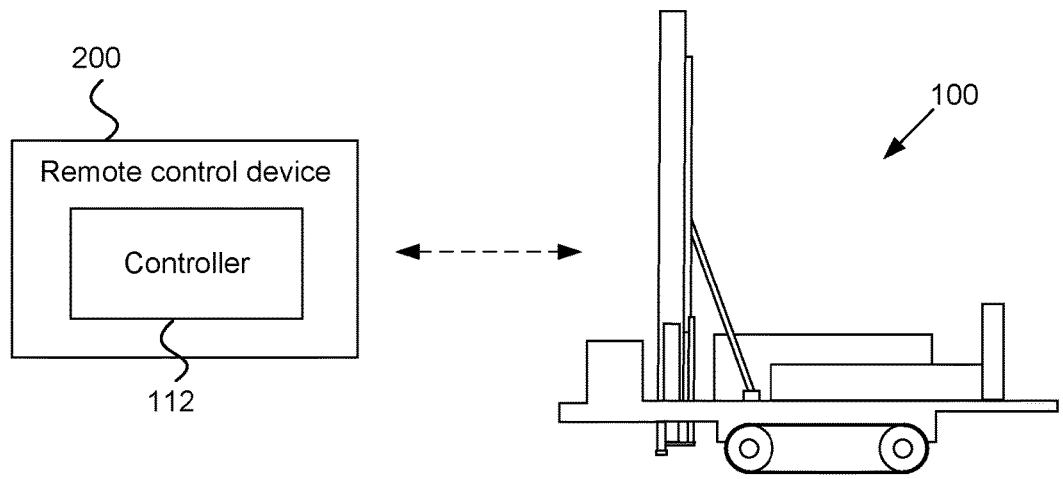
FIG. 2 illustrates an example of a track-mounted drill rig communicatively coupled to a remote control device.

Controller 112 may be alternatively located external to track-mounted drill rig 100 and configured to remotely control track-mounted drill rig 100. For example, controller 112 may be provided at remote control device 200, which may be external to track-mounted drill rig 100, as illustrated in FIG. 2. Remote control device 200 may comprise a server or other computing device located remote from track-mounted drill rig 100, for example at a remote operator station. Functionality of controller 112 may be provided at track-mounted drill rig 100, remote control device 200, or distributed between track-mounted drill rig 100 and remote control device 200. Information may be exchanged between controller 112 and track-mounted drill rig 100 over a data communication interface including any suitable wireless or wired connection. Examples of suitable communication interfaces are described with reference to FIG. 8.

Track-mounted drill rig 100 may comprise a positioning system comprising positioning device(s), for example a Global Positioning System (GPS) receiver(s), Global Navigation Satellite System (GNSS), other satellite positioning device(s), and/or a non-satellite positioning device(s). The positioning device(s) may be configured to determine a current navigation position of track-mounted drill rig 100. For example, a positioning device may be coupled to a particular part of track-mounted drill rig 100 and thereby configured to determine the position of that part of track-mounted drill rig 100 as the navigation position. Alternatively, controller 112 may be configured to determine the navigation position based on data received from multiple positioning devices of track-mounted drill rig 100, for example as the centre point of the positions detected by the positioning devices. The navigation position may therefore comprise a position of a certain reference point of track-mounted drill rig 100 in the external coordinate frame ($F_{ext}$). The reference point may be referred to as a positioning reference point. The positioning reference point may be located within track-mounted drill rig 100.

The position of pivot point 138 may be defined in the coordinate frame of track-mounted drill rig 100 ($F_{rig}$), for example with respect to the positioning reference point of track-mounted drill rig 100 detected by the positioning system. This enables to monitor position of pivot point 138 with respect to the external coordinate frame ($F_{ext}$), e.g., with respect to drilling surface 140. Furthermore, controller 112 may be configured to determine the relative position of aiming point 140 with respect to the positioning reference point. The relative position of aiming point 140 with respect to the positioning reference point may be fixed, for example if it is not possible to move or incline mast 130. Alternatively, controller 112 may be configured to determine the relative position of aiming point 134 with respect to the positioning reference point based on the configuration (e.g., inclination angle) of mast 130 configured to be used during drilling. Controller 112 may be configured to determine the relative position of aiming point 134 with respect to pivot point 138, for example based on the relative positions of aiming point 134 and pivot point 138 with respect to the positioning reference point. Determining the relative position of aiming point 134 with respect to pivot point 138 enables controller 112 to determine an expected trajectory of aiming point 134 when track-mounted drill rig 100 is caused to turn around pivot point 138, optionally with pivot point 138 moving with respect to drilling surface 140, as will be further described below. The expected trajectory of aiming point 134 may be called a turning trajectory of aiming point 134.

Figure 3:
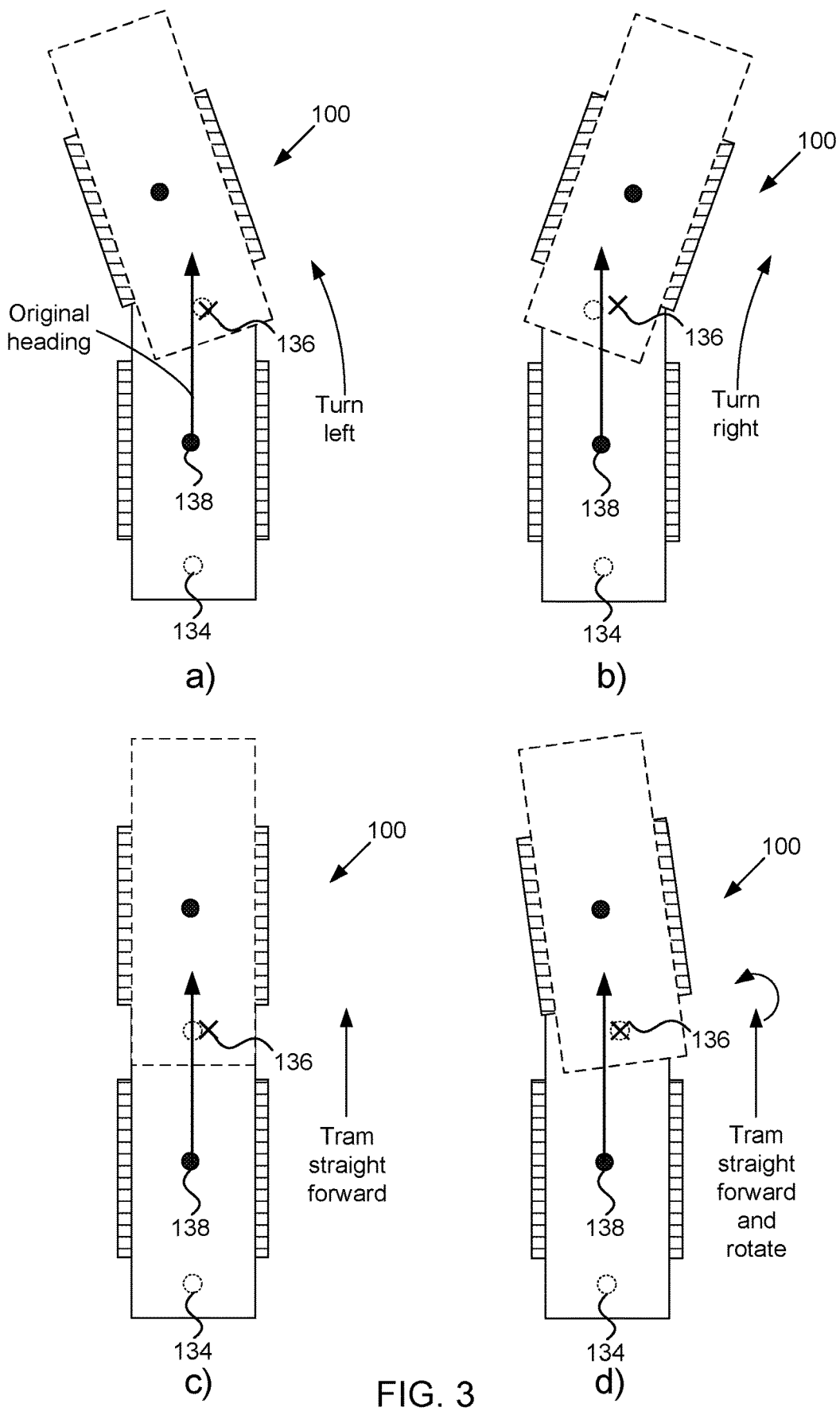
FIG. 3 illustrates examples of movement of a track-mounted drill rig with respect to a target position of a drill bit.

FIG. 3 illustrates examples of movement of a track-mounted drill rig with respect to a target position of a drill bit. Automated tramming applications may be configured to apply various means for positioning track-mounted drill rig 100 on a given route or on a given position for drilling. In case of automated tramming to target position 136 of a planned hole, controller 112 may be configured to position aiming point 134 over target position 136 such the hole can be accurately drilled to the position indicated in the drilling plan. Track-mounted drill rig 100 may be however large and drill bit 132 may be located far away from pivot point 138. Therefore, when the heading of track-mounted drill rig 100 is changed, the position of drill bit 132 and aiming point 134 may change rapidly. This makes it difficult to correct a distance error in short space while maintaining heading error at a reasonable level. Distance error may comprise a distance between aiming point 134 and target position 136 upon initiation of drilling. In the examples of FIG. 3, track-mounted drill rig 100 moves from the position indicated with solid lines to the position indicated with dashed lines. Target position 136 of drill bit 132 is located on the right side compared to the original heading of track-mounted drill rig 100.

In FIG. 3a, track-mounted drill rig 100 has trammed forward and turned left, which has caused a slight misalignment between aiming point 134 (after the movement) and target position 136. In FIG. 3b, track-mounted drill rig 100 has trammed forward and turned right, which has caused a more significant misalignment between aiming point 134 and target position 136. In FIG. 3c, track-mounted drill rig 100 has trammed straight forward. Aiming point 134 has therefore moved in the direction of the original heading, resulting in misalignment of aiming point 134 and target position 136. In FIG. 3d, track-mounted drill rig 100 has trammed straight forward and then rotated left, which has enabled to align aiming point 134 and target position 136 accurately.

The examples of FIGS. 3a, 3b, and 3c illustrate the challenges in controlling movement of track-mounted drill rig 100 such that aiming point 134 would be aligned with target position 136. Example embodiments of the present disclosure enable to control tramming and turning of track-mounted drill rig 100 such that sufficient alignment between aiming point 134 and target position 136 is achieved. For example, in the case of FIG. 3d, a condition for terminating tramming (e.g., forward tramming to approach target position 136) may be selected such that the target position is at the turning circle of aiming point 134. This enables aligning aiming point 134 over the target position by rotating track-mounted drill rig 100. It is however also possible to control turning of track-mounted drill rig 100 during tramming such that aiming point 134 is aligned over the target position. Aligning aiming point 134 with target position 136 may comprise controlling track-mounted drill rig 100 such that aiming point 134 is moved sufficiently close to target point 136, for example in order to initiate drilling the hole planned for target position 136. Aiming point 134 may be considered to be aligned with target position 136 when aiming point 134 is located within an acceptable tolerance from target position 136. The tolerance may be dependent on the type of the drilling task to be performed, and may range for example from 15 to 25 cm. As another example, aiming point 134 may be considered to be aligned with target position 136, if any part of drill bit 132 is configured to hit target position 136 when drilling the hole at aiming point 134.

Additionally, controller 112 may be configured to determine whether drilling at aiming point 134 would result in sufficient alignment of the end point of the hole, when drilled starting from aiming point 134, and a planned end point of the hole. Controller 112 may be configured to apply the same tolerance range of 15 to 25 cm for determining whether the end points are sufficiently aligned. Controller 134 may be therefore configured to determine that aiming point 134 is aligned with target position 136, in response to determining that estimated start and end points of the hole to be drilled are aligned (e.g., within a tolerance distance) from planned start and end points of the hole.

Figure 4:
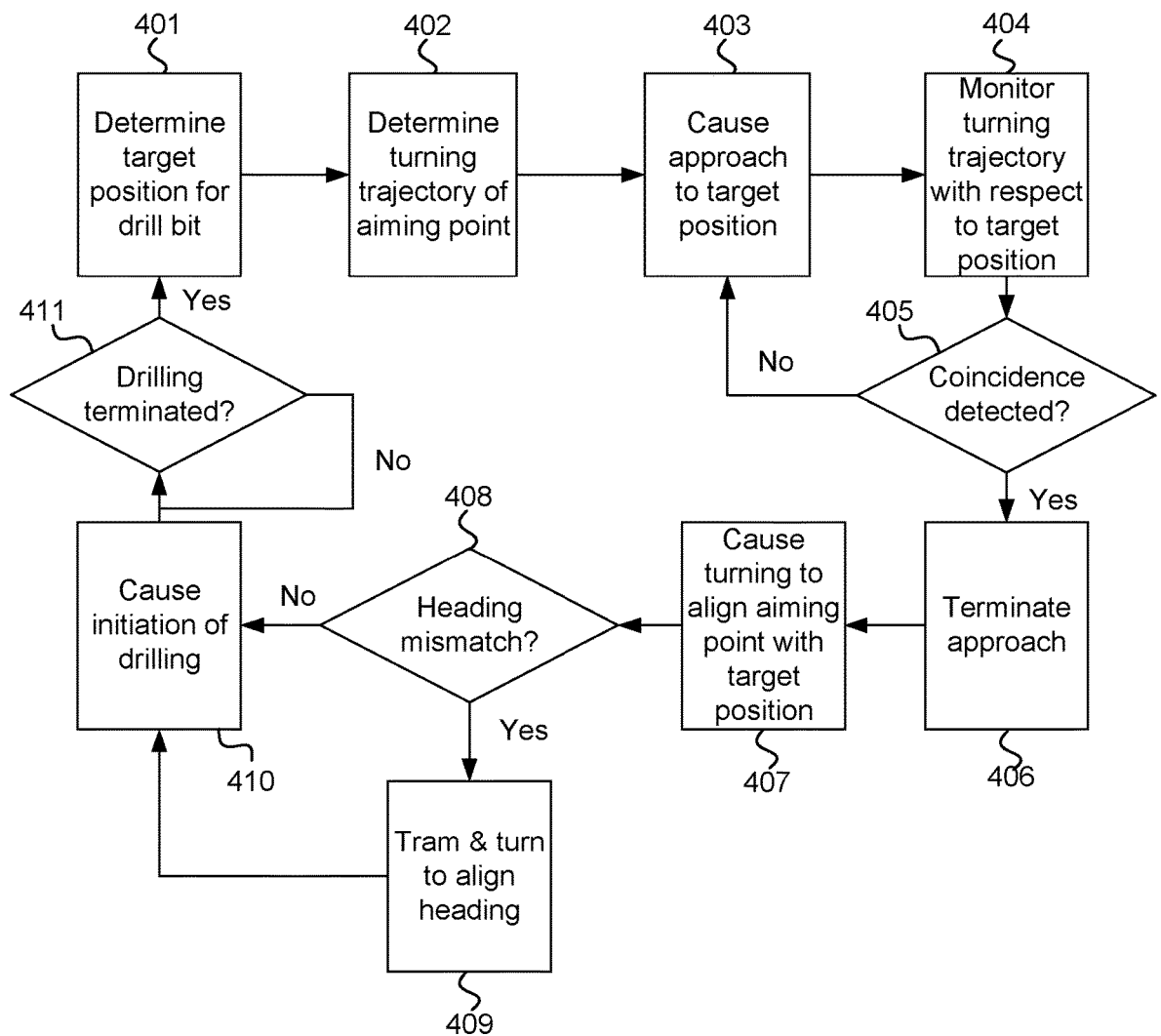
FIG. 4 illustrates an example of a flow chart for controlling a track-mounted drill rig.

FIG. 4 illustrates an example of a flow chart for controlling a track-mounted drill rig. Operations of the flow chart may be configured to be performed by controller 112 or any suitable apparatus located within or outside track-mounted drill rig 100.

At operation 401, controller 112 may be configured to determine target position 136 for drill bit 132. As described above, controller 112 may be configured to determine target position 136 based on the drilling plan, for example by selecting a next target position from the drilling plan. The next target position may be a target position located next to a previously drilled hole, for example a next target position in row of target positions or a target position in a next row of target positions.

At operation 402, controller 112 may be configured to determine a turning trajectory of aiming point 134. The turning trajectory of aiming point 134 may be defined relative to the current position of track-mounted drill rig 100, for example the current position of the positioning reference point of track-mounted drill rig 100. The turning trajectory may be associated with potential turning of track-mounted drill rig 100 at, or from, its current position. The turning trajectory may comprise a trajectory, which aiming point 134 would travel, if track-mounted drill rig 100 were to perform a predetermined turning action at, or starting from, its current position.

Note that the turning action may comprise rotation of track-mounted drill rig 100 without non-rotational transition with respect to drilling surface 140, as in the example of FIG. 3d. In this case, the turning trajectory may be defined based on a rotational circle of aiming point 134. Alternatively, the turning action may comprise turning track-mounted drill rig 100 during forward or backward tramming such that there is also non-rotational transition with respect to drilling surface 140. In this case, the turning trajectory may be defined by the rotation of track-mounted drill rig 100 around pivot point 138 and movement of pivot point 138 during the turning. Controller 112 may be configured to cause the predetermined turning action by controlling track(s) 120 to roll with predetermined direction(s) and speed(s).

Controller 112 may be configured to determine the turning trajectory of aiming point 134 based on pivot point 138. For example, controller 112 may be configured to determine the turning trajectory of aiming point 134 based on pivot point 138 and the distance between aiming point 134 and pivot point 138. For example, in case track-mounted drill rig 100 is configured to rotate around pivot point 138 without non-rotational transition with respect to drilling surface 140, controller 112 may be configured to determine the turning trajectory to comprise at least part of the rotational circle of aiming point 134. The rotational circle may comprise a circle centred at pivot point 138 and having a radius equal to the distance between pivot point 138 and aiming point 134.

Controller 112 may be however configured to also take into account forward or backward movement of track-mounted drill rig 100 during the turning action. In this case, controller 112 may be configured to determine the turning trajectory of aiming point 134 based on pivot point 138, the relative position of aiming point 134 with respect to pivot point 138, and a calculated movement of pivot point 138 associated with the potential turning of track-mounted drill rig 100. For example, controller 112 may be configured to calculate an expected movement of pivot point 138, when performing the predetermined turning action. The expected movement may comprise a trajectory of pivot point 138 during the potential turning of track-mounted drill rig 100. Controller 112 may be configured to determine the turning trajectory of aiming point 134 based on superimposing the relative position of aiming point 134 with respect to pivot point 138 on the calculated trajectory of pivot point 138 during the potential turning of track-mounted drill rig 100.

At operation 403, controller 112 may be configured to cause track-mounted drill rig 100 to approach target position 136. When arriving at operation 403 from operation 402, controller 112 may be configured to cause track-mounted drill rig 100 to initiate the approach towards target position 136. When arriving at operation from 403 from operation 402, controller 112 may be configured to cause track-mounted drill rig 100 to continue the approach towards target position 136. Controller 112 may be for example configured to control tracks 120 to align heading of track-mounted drill rig 100 towards target position 136 and to initiate/continue tramming accordingly.

Track-mounted drill rig 100 may be configured with a state machine, which indicates the current operational state of track-mounted drill rig 100 in a sequence of operations of track-mounted drill rig 100, for example whether track-mounted drill rig is in an approach state, alignment state, or drilling state. The approach to target position 136 may be performed in the approach state of track-mounted drill rig 100. The approach state may correspond to a stage, where a primary target is to move track-mounted drill rig 100 closer to target position 136. The approach state may be followed by the alignment state, where the primary target may be to align aiming point 134 with target position 136. Note that even during the alignment phase track-mounted drill rig 100 may be configured to move closer to target position 136, but the primary target in this state may be to align aiming point 134 with target position 136.

Even though operations 401, 402, and 403 have been illustrated in FIG. 4 to be in a particular order, it is noted that these and any other operations may be performed in any suitable sequential order, and/or in parallel, where appropriate. For example, controller 112 may be configured to determine the turning trajectory of aiming point 134 (cf., operation 402) before determining the target position 136. Controller 112 might be also configured to determine the turning trajectory (cf., operation 402) during the approach to the target position (cf., operation 403).

When initiating the approach to target position 136 in response to terminating drilling of a hole at a previous position of aiming point 134, controller 112 may be configured to cause turning (e.g., rotation) of track-mounted drill rig 100 towards the next target position of drill bit 132. Controller 112 may be further configured to cause track-mounted drill rig 100 to tram towards the next target position, in response to completing the turning of the track-mounted drill rig 100 towards the next target position. This provides the benefit of reducing the distance to be trammed to the next target position. This may be applied for example in case of inclined holes, when the heading of track-mounted drill rig 100 may need to be adjusted for drilling the inclined hole such that the heading during the drilling departs from the optimal heading for tramming to the next target position.

Figure 6:
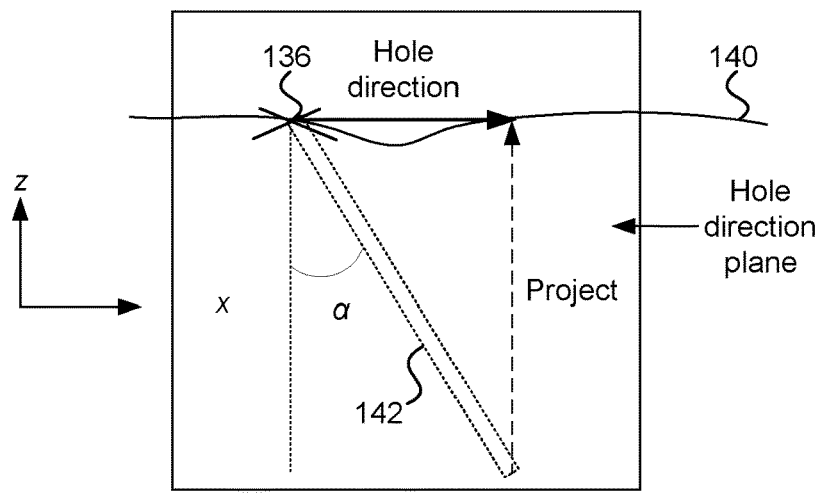
FIG. 6 illustrates an example of an inclined hole planned to be drilled on a drilling surface.

When initiating approach to a next target hole, the next hole being an inclined hole, controller 112 may be configured to cause turning (e.g., rotation) of track-mounted drill rig 100 towards a line defined by the direction of the inclined hole (e.g., hole direction plane, see FIG. 6). Controller 112 may be configured to cause track-mounted drill rig 100 to tram such that pivot point 138 is positioned in line with the next target position in the direction of the inclined hole. Controller 112 may be configured to cause track-mounted drill rig 100 to turn such that the heading of track-mounted drill rig 100 is aligned with the direction of the inclined hole and that aiming point 134 is aligned with the next target position. For example, controller 112 may be configured to cause track-mounted drill rig 100 to rotate such that its heading is aligned with the direction of the inclined hole, when pivot point 183 is in line with the direction of the inclined hole, and then to tram towards the next target position until aiming point 134 is aligned with the next target position.

At operation 404, controller 112 may be configured to monitor position of the turning trajectory of aiming point 134 with respect to target position 136. Operation 404 may be performed during the approach of track-mounted drill rig 100 to target position 136. A noted above, controller 112 may be configured to determine the turning trajectory with respect to track-mounted drill rig 100 (e.g., pivot point 138 or the positioning reference point), for example in the coordinate frame of track-mounted drill rig 100 ($F_{rig}$). Controller 112 may be configured to determine the position of the turning trajectory of aiming point 134 with respect to drilling surface 140, e.g., in the external coordinate frame ($F_{ext}$). Controller 112 may be configured to update the position of the turning trajectory with respect to drilling surface 140 when track-mounted drill rig 100 is approaching target position 136. Controller 112 may be configured to monitor whether any point of the turning trajectory substantially coincides (e.g., is closer than a threshold distance) with target position 136.

At operation 405, controller 112 may be configured to determine whether the turning trajectory (e.g., any point thereof) coincides with target position 136. Controller 112 may be configured to continue the approach to target position 136 in operation 403, in response to determining that the turning trajectory does not (yet) coincide with target position 136. Controller 112 may be configured to move to execution of operation 406 or 407, in response to determining that the turning trajectory substantially coincides with target position 136, for example that a distance between target position 136 and the closest point of the turning trajectory is within a threshold distance (e.g., 10-25 cm).

Figure 5:
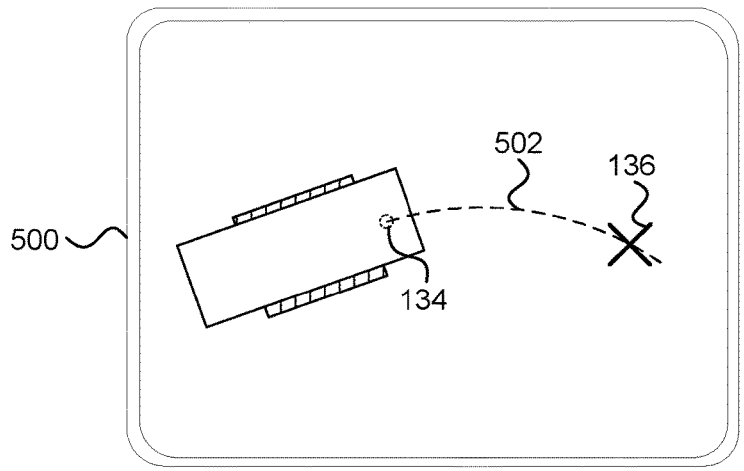
FIG. 5 illustrates an example of visualizing a turning trajectory of an aiming point on a display.

Alternatively, controller 112 may be configured to visualize the turning trajectory of aiming point with respect to target position 136, for example on a display of track-mounted drill rig 100 or a remote operator station. This would enable a human operator to determine whether the turning trajectory substantially coincides with target position and to trigger, by a user input, the turning of track-mounted drill rig 100 to align aiming point 134 with target position 136. An example of visualising turning trajectory 502 on display 500 is illustrated in FIG. 5. Display 500 may be located at track-mounted drill rig 100 or at remote control device 200 (e.g., a remote operator station).

At operation 406, controller 112 may be configured to terminate the approach to target position 136. Controller 112 may be for example configured to cause track-mounted drill rig 110 to stop, e.g., terminate tramming on drilling surface 140. In general, terminating the approach may comprise terminating the approach state in order to proceed to the alignment state, as described above. Terminating the approach may be therefore completed with or without stopping track-mounted drill rig 100. Alternatively, controller 112 may be configured to move directly from operation 405 to operation 407 without any consideration on whether track-mounted drill rig 100 is in the approach state or not.

At operation 407, controller 112 may be configured to cause turning of track-mounted drill rig 100 to align aiming point 134 with target position 136. Controller 112 may be configured to perform operation 407 in response to determining, e.g., at operation 405, that the turning trajectory of aiming point 134 substantially coincides with target position 136.

Alternatively, or additionally, controller 112 may be configured to cause turning of track-mounted drill rig 100 to align aiming point 134 with target position 136, in response to termination of the approach of the track-mounted drill rig 100 to the target position. For example, controller 112 may be configured to perform operation 407, in response to detecting that track-mounted drill rig has stopped due to the coincidence of the turning trajectory of aiming point 134 and target position 136, or in response to detecting that track-mounted drill rig 100 proceeds to the alignment state.

Alternatively, or additionally, controller 112 may be configured to cause turning of track-mounted drill rig 100 to align aiming point 134 with target position 136, in response to receiving a user input configured to trigger the alignment. For example, controller 112 may be configured to prompt a human operator to accept the turning action, or proceeding to the alignment state, via a user interface. This provides the benefit of enabling manual intervention in the process.

Aligning aiming point 134 with target position 136 may comprise controlling turning of track-mounted drill rig 100 such that aiming point 134 substantially coincides with target position 136, for example such that aiming point 134 is at a desired relative position with respect to target position 136 (e.g., within an acceptable distance from target position 136).

At operations 408 and 409, controller 112 may be configured to handle possible mismatch between heading of track-mounted drill rig 100 and the direction of an inclined hole. Note that operations 408 and 409 might not be present for non-inclined holes, e.g., holes penetrating drilling surface 140 perpendicularly. In some embodiments, controller 112 may be therefore configured to move from execution of operation 407 directly to execution of operation 410.

FIG. 6 illustrates an example of an inclined hole planned to be drilled on a drilling surface. An inclined hole 142 has a non-zero inclination angle (a) with respect to an axis perpendicular to drilling surface 140. The start point of inclined hole 142 may correspond to target position 136. A direction of inclined hole 142 may comprise a direction of a projection of the inclined hole to drilling surface 140, as illustrated in FIG. 6. If inclined hole 142 is a straight hole and drilling surface 140 is considered as a plane, the projection of inclined hole 142 to drilling surface 140 is a straight projection line.

When considering drilling surface 140 as an uneven 3D surface, the projection of inclined hole 142 to drilling surface 140 is a projection curve starting from target position 136 and extending on a plane (e.g., a vertical plane) along drilling surface 140 towards the projection of the end point of inclined hole 142 to drilling surface 140. For the purposes of this specification, this plane is called the hole direction plane. The direction of inclined hole 142 may be defined for example as the direction from target position 136 to end point of the projection curve. Any point on the hole direction plane may be considered to be in line with the direction of inclined hole 142.

Referring back to FIG. 4, at operation 408 controller 112 may be configured to determine whether there is a mismatch between heading of track-mounted drill rig 100 and the direction of an inclined hole configured to be drilled at target position 136. Controller 112 may be configured to determine a heading of track-mounted drill rig 100. The heading may comprise an actual heading subsequent to turning of track-mounted drill rig 100 at operation 407. Alternatively, controller 112 may be configured to perform operation 408 before operation 407. In this case, controller 112 may be configured to determine, e.g., by calculations, a heading that would result from turning track-mounted drill rig 100 to align aiming point 134 with target position 136. The heading subsequent to the potential turning may be therefore simulated by controller 112.

When considering drilling surface 140 as a plane, controller 112 may be configured to determine that the heading of track-mounted drill rig 100 does not correspond to the direction of inclined hole 142, if the heading of track-mounted drill rig 100 on drilling surface 140 deviates (e.g., by a threshold angle) from the direction of the projection of inclined hole 142 to drilling surface 140. When considering drilling surface 140 as an uneven 3D surface, controller 112 may be configured to determine that the heading of track-mounted drill rig 100 does not correspond to the direction of inclined hole 142, if the movement of drill bit 132 would not stay within the hole direction plane, when drilling with the current heading of track-mounted drill rig 100. Alternatively, controller 112 may be configured estimate start and end positions of the hole to be drilled based on the heading of track-mounted drill rig 100 and compare the estimated positions to target positions of the start and end points of the hole. Controller 112 may be configured to determine that the heading of track-mounted drill rig 100 does not correspond to the direction of inclined hole 142, in response to determining that the estimated start and end positions deviate from the planned start and end positions, for example by a tolerance distance (e.g., 10-25 cm).

Figure 7:
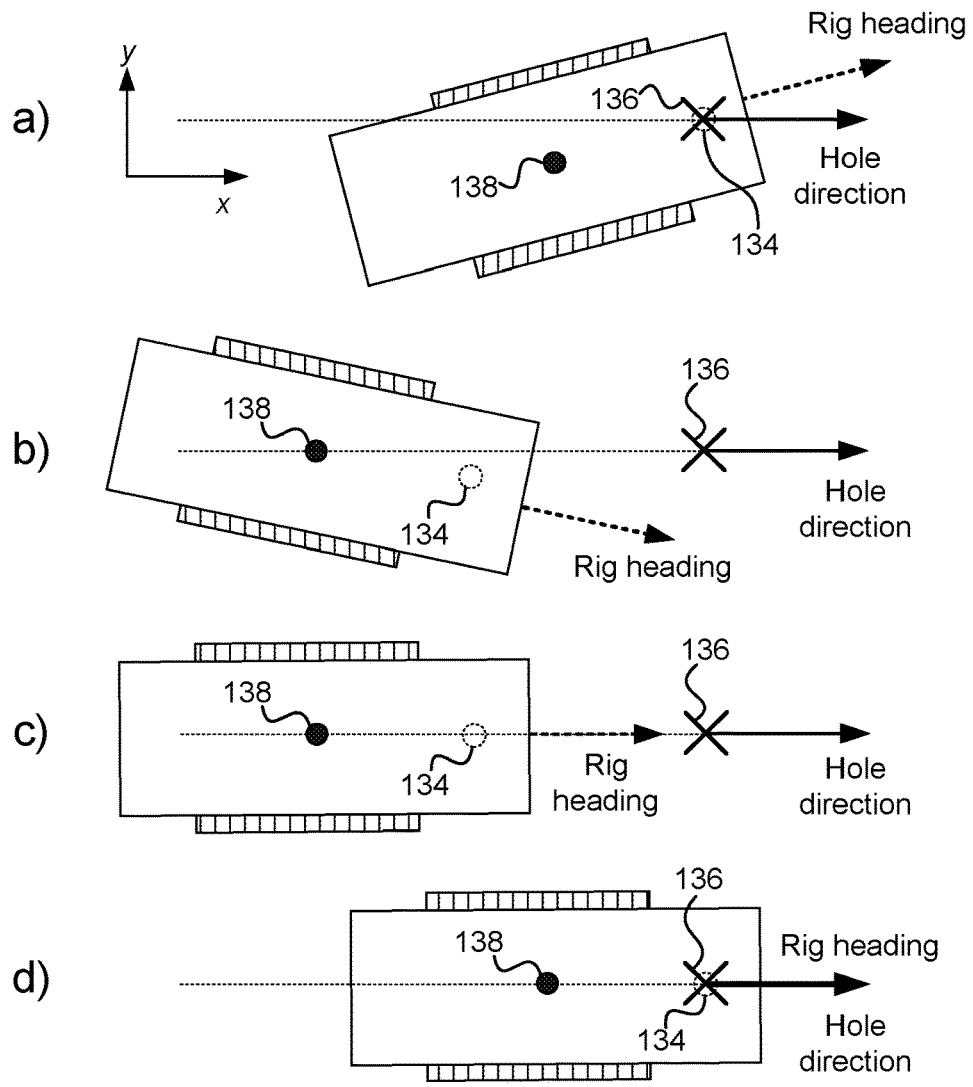
FIG. 7 illustrates an example of correcting heading of a track-mounted drill rig to correspond to a direction of an inclined hole.

An example of correcting heading of track-mounted drill rig 100 to correspond to the direction of an inclined hole is illustrated in FIG. 7. FIG. 7a illustrates a mismatch between heading of track-mounted drill rig 100 and the direction of inclined hole 142. Even if aiming point 134 coincides with target position 136, track-mounted drill rig 100 may not be able to drill inclined hole 142 as planned, because track-mounted drill rig 100 might be only able to adjust the inclination angle of mast 130 and not its direction.

At operation 409, controller 112 may be configured perform the following operations, in response to determining at operation 408 that the heading of track-mounted drill rig 100 does not correspond to the direction of inclined hole 142 planned to be drilled at target position 136:

Cause tramming of track-mounted drill rig 100 to align pivot point 138 in line with target position 138 in the direction of inclined hole 142. For example, considering the 2D example of FIG. 7b, controller 112 may be configured to cause track-mounted drill rig 100 to reverse such that pivot point 138 is positioned on an extension of the projection of inclined hole 142 on drilling surface 140. Considering drilling surface as an uneven 3D surface, controller 112 may be configured to cause track-mounted drill rig 100 to tram such that pivot point 138 is located on the hole direction plane. In both cases, pivot point 138 may be considered to be in line with the direction of inclined hole 142.

Cause turning of track-mounted drill rig 100 (e.g., rotating without non-rotational transition) to align the heading of track-mounted drill rig 100 with the direction of inclined hole 142. For example, controller 112 may be configured to cause track-mounted drill rig 100 to rotate such that aiming point 134 is between pivot point 138 and target position 136, as illustrated in FIG. 7c.

Cause tramming of track-mounted drill rig 100, without turning, to align aiming point 134 with target position 136, as illustrated in FIG. 7d. Based on this procedure the heading of track-mounted drill rig 100 may be aligned with the direction of inclined hole and aiming point 134 may be aligned with target position 136, thereby enabling drilling of inclined hole 142.

When controller 112 is located at track-mounted drill rig 100, controller 112 may be configured to control tramming, turning, and/or rotation of track-mounted drill rig 100 by providing control instructions to movable carrier 110, in order to cause desired movement of track-mounted drill rig 100, e.g., by means of tracks 120. When controller 112 is located at remote control device 200, controller 112 may be configured control tramming, turning, and/or rotation of track-mounted drill rig 100 by transmitting the control instructions to track-mounted drill rig 100 to cause the desired movement of track-mounted drill rig 100.

Referring back to FIG. 4, at operation 410 controller 112 may be configured to cause track-mounted drill rig 100 to initiate drilling at aiming point 134. Controller 112 may be for example configured to send control instructions or signals to actuators of track-mounted drill rig 100 to cause drill bit 132 to hit aiming point 134 and penetrate drilling surface 140 at a desired inclination angle. When controller 112 is located at track-mounted drill rig 100, controller 112 may be configured to control drilling by providing control instructions to the drilling unit of track-mounted drill rig 100, in order to cause desired movement of drill bit 132. When controller 112 is located at remote control device 200, controller 112 may be configured control the drilling by transmitting the control instructions to track-mounted drill rig 100, to cause the desired movement of drill bit 132.

At operation 411, controller 112 may be configured to determine whether drilling has been terminated, for example whether drill bit 132 has reached the planned end point and whether drill bit 132 has been pulled back from drilling surface 140. If not, controller 112 may be configured to wait until terminating drilling. Controller 112 may be configured to proceed back to operation 401 to determine a next target position, once the drilling has been terminated. Alternatively, controller 112 may be configured to determine the next target position before terminating the drilling, for example when drilling is ongoing. Furthermore, it is noted that operation 402 need not be performed again, if the turning trajectory of aiming point 134 has not changed. Controller 112 may be however configured to determine the turning trajectory again, for example if controller 112 determines, or is instructed (e.g., by user input), to change the predetermined turning action for aligning aiming point 134 with target position 136. Controller 112 may be anyway configured to cause performance of operation 403, in response to detecting termination of drilling at operation 411.

Operations of FIG. 4 therefore enable autonomous or semi-autonomous execution of the drilling plan with accurate alignment of drill bit 132 with the target positions for drilling the holes. This improves efficiency of drilling, because unnecessary time used for re-alignment due to incorrectly placed drill bit may be avoided.

Figure 8:
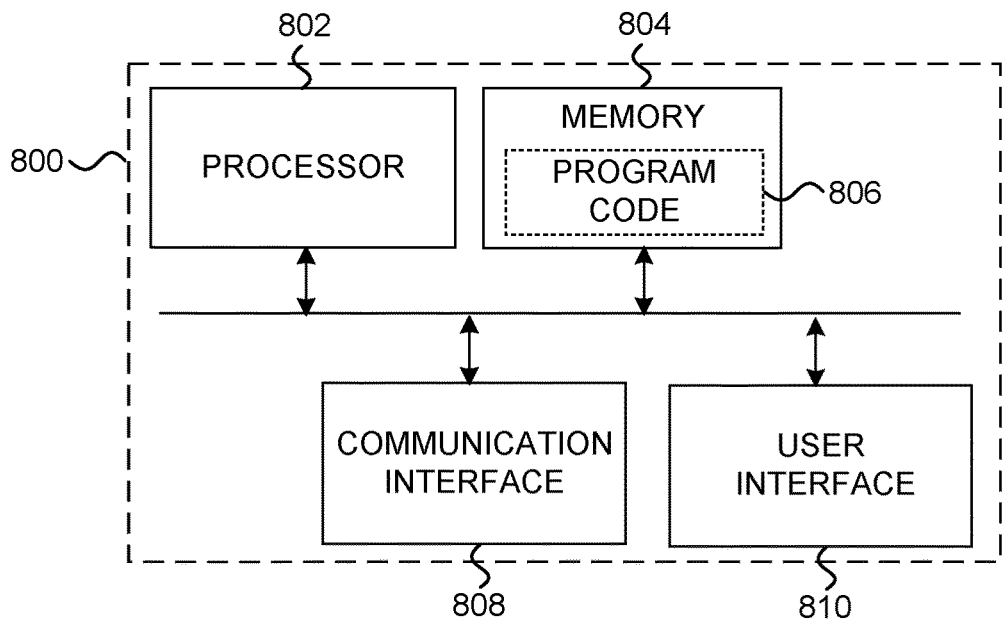
FIG. 8 illustrates an example of an apparatus configured to practise one or more example embodiments.

FIG. 8 illustrates an example of an apparatus configured to practise one or more example embodiments. Apparatus 800 may be or comprise a track-mounted drill rig control apparatus, such as for example a server communicatively coupled to track-mounted drill rig 100, a control apparatus located at track-mounted drill rig 100, controller 112, track-mounted drill rig 100 itself, or in general any device or system configured to implement the functionality described herein. Although apparatus 800 is illustrated as a single device, it is appreciated that, wherever applicable, functions of apparatus 800 may be distributed to a plurality of devices.

Apparatus 800 may comprise at least one processor 802. The at least one processor 802 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), programmable logic controller (PLC), a hardware accelerator, a special-purpose computer chip, or the like.

Apparatus 800 may further comprise at least one memory 804. The at least one memory 804 may be configured to store, for example, computer program code or the like, for example operating system software and application software. The at least one memory 804 may comprise one or more volatile memory devices, one or more non-volatile memory devices, and/or a combination thereof. For example, the memory may be embodied as magnetic storage devices (such as hard disk drives, etc.), optical magnetic storage devices, or semiconductor memories (such as mask ROM, PROM (programmable ROM), EPROM (erasable PROM), flash ROM, RAM (random access memory), etc.). Memory 804 is provided as an example of a (non-transitory) computer readable medium. The term "non-transitory," as used herein, is a limitation of the medium itself (i.e., tangible, not a signal) as opposed to a limitation on data storage persistency (e.g., RAM vs. ROM). The at least one memory 804 may be also embodied separate from apparatus 800, for example as a computer readable (storage) medium, examples of which include memory sticks, compact discs (CD), or the like.

When apparatus 800 is configured to implement some functionality, some component and/or components of apparatus 800, such as for example the at least one processor 802 and/or the at least one memory 804, may be configured to implement this functionality. Furthermore, when the at least one processor 802 is configured to implement some functionality, this functionality may be implemented using program code 806 comprised, for example, in the at least one memory 804.

The functionality described herein may be performed, at least in part, by one or more computer program product components such as software components. According to an example embodiment, apparatus 800 comprises a processor or processor circuitry, such as for example a microcontroller, configured by program code 806, when executed, to execute the embodiments of the operations and functionality described herein. Program code 806 is provided as an example of instructions which, when executed by the at least one processor 802, cause performance of apparatus 800.

For example, controller 112 may be at least partially implemented as program code configured to cause apparatus 800 to perform functionality of controller 112. Similarly, transmission or reception of data, e.g., data, instruction(s), signal(s), or command(s), over an internal or external communication interface of track-mounted drill rig 100 may be controlled by software.

Alternatively, or in addition, the functionality described herein can be performed, at least in part, by one or more hardware logic components. For example, and without limitation, illustrative types of hardware logic components that can be used include field-programmable gate arrays (FPGA), application-specific integrated circuits (ASIC), application-specific standard products (ASSP), system-on-a-chip systems (SOC), complex programmable logic devices (CPLD), graphics processing units (GPU), neural processing units (NPU), tensor processing units (TPU), or the like. Controller 112 may comprise control circuitry, for example any of the above hardware logic components or a combination of at least one processor and least one memory, for implementing functionality described herein.

Apparatus 800 may comprise a communication interface 808 configured to enable apparatus 800 to transmit and/or receive information. Communication interface 808 may comprise an internal or external communication interface, such as for example a radio interface between track-mounted drill rig 100 and controller 112 or an internal control bus within track-mounted drill rig 100. Apparatus 800 may further comprise other components and/or functions such as for example user interface 810 comprising at least one input device and/or at least one output device. The input device may take various forms such as a keyboard, a touch screen, or one or more embedded control buttons, joysticks, or other type of manual controllers. The output device may for example comprise a display, a speaker, or the like. User interface 810 may be configured to enable a human operator to monitor or control various functions of track-mounted drill rig 100.

Apparatus 800 may be configured to perform or cause performance of any aspect of the method(s) described herein. Further, a computer program or a computer program product may comprise instructions for causing, when executed by apparatus 800, apparatus 800 to perform any aspect of the method(s) described herein. Further, apparatus 800 may comprise means for performing any aspect of the method(s) described herein. In one example, the means comprises the at least one processor 802, the at least one memory 804 including program code 806 (instructions) configured to, when executed by the at least one processor 802, cause apparatus 800 to perform the method(s). In general, computer program instructions may be executed on means providing generic processing functions. Such means may be embedded for example in a computer, a server, or the like. The method(s) may be thus computer-implemented, for example based algorithm(s) executable by the generic processing functions, an example of which is the at least one processor 802. Apparatus 800 may comprise means for transmitting or receiving information, for example one or more wired or wireless (e.g., radio) transmitters or receivers, which may be coupled or be configured to be coupled to one or more antennas, or transmitter(s) or receiver(s) of a wired communication interface.

According to a first aspect, an apparatus for controlling track-mounted drill rig is disclosed. The apparatus may comprise: at least one processor; and at least one memory including computer program code, the at least one memory and the computer program code configured to, with the at least one processor, cause the apparatus at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

According to an example embodiment of the first aspect, the computer program code is further configured to, with the at least one processor, cause the apparatus to: cause the turning of the track-mounted drill rig to align the aiming point of the drill bit with the target position of the drill bit, in response to terminating the approach of the track-mounted drill rig to the target position, or cause the turning of the track-mounted drill rig to align the aiming point of the drill bit with the target position of the drill bit, in response to receiving a user input configured to trigger alignment of the aiming point of the drill bit with the target position of the drill bit.

According to an example embodiment of the first aspect, the turning trajectory of the aiming point of the drill bit is relative to a current position of the track-mounted drill rig and associated with potential turning of the track-mounted drill rig at or from the current position of the track-mounted drill rig.

According to an example embodiment of the first aspect, the computer program code is further configured to, with the at least one processor, cause the apparatus to: determine a pivot point of the track-mounted drill rig; and determine the turning trajectory of the aiming point of the drill bit based on the pivot point of the track-mounted drill rig and a distance between the aiming point of the drill bit and the pivot point of the track-mounted drill rig, wherein the turning trajectory comprises at least part of a rotational circle of the aiming point of the drill rig.

According to an example embodiment of the first aspect, the computer program code is further configured to, with the at least one processor, cause the apparatus to: determine a pivot point of the track-mounted drill rig; and determine the turning trajectory of the aiming point of the drill bit based on the pivot point of the track-mounted drill rig, a relative position of the aiming point of the drill bit with respect to the pivot point of the track-mounted drill rig, and a calculated movement of the pivot point of the track-mounted drill rig associated with the potential turning of the track-mounted drill rig.

According to an example embodiment of the first aspect, the computer program code is further configured to, with the at least one processor, cause the apparatus to: determine a heading of the track-mounted drill rig, wherein the heading of the track-mounted drill rig comprises a heading subsequent to the turning of the track-mounted drill rig or a heading determined to be caused by the turning of the track-mounted drill rig; and in response to determining that the heading of the track-mounted drill rig does not correspond to a direction of an inclined hole planned to be drilled at the target position of the drill bit: cause tramming of the track-mounted drill rig to align the pivot point of the track-mounted drill rig in line with the target position of the drill bit in the direction of the inclined hole, cause turning of the track-mounted drill rig to align the heading of the track-mounted drill rig with the direction of the inclined hole, and cause tramming of the track-mounted drill rig, without turning the track-mounted drill rig, to align the aiming point of the drill bit with the target position of the drill bit.

According to an example embodiment of the first aspect, the target position of the drill bit comprises a target position of the drill bit on, or relative to, a drilling surface.

According to an example embodiment of the first aspect, the direction of the inclined hole comprises a direction of a projection of the inclined hole to the drilling surface.

According to an example embodiment of the first aspect, the aiming point of the drill bit comprises an aiming point of the drill bit on, or relative to, the drilling surface.

According to an example embodiment of the first aspect, the computer program code is further configured to, with the at least one processor, cause the apparatus to: determine the target position for the drill bit based on a drilling plan configured to indicate planned starting positions of a plurality of holes planned to be drilled on the drilling surface.

According to an example embodiment of the first aspect, the computer program code is further configured to, with the at least one processor, cause the apparatus to: cause the track-mounted drill rig to initiate drilling at the aiming point of the drill bit.

According to an example embodiment of the first aspect, the computer program code is further configured to, with the at least one processor, cause the apparatus to: determine a next target position for the drill bit; cause turning of the track-mounted drill rig towards the next target position of the drill bit, in response to terminating the drilling at the aiming point of the drill bit; and cause tramming of the track-mounted drill rig towards the next target position of the drill bit, in response to completing the turning of the track-mounted drill rig towards the next target position.

According to an example embodiment of the first aspect, the apparatus is external to the track-mounted drill rig and configured to remotely control the track-mounted drill rig.

According to a second aspect, a track-mounted drill rig is disclosed. The track-mounted drill rig may comprise: at least one processor; and at least one memory including computer program code, the at least one memory and the computer program code configured to, with the at least one processor, cause the track-mounted drill rig at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit. The computer program code may be configured to, with the at least one processor, cause the track-mounted drill rig to perform any example embodiment(s) of the apparatus of the first aspect.

Figure 9:
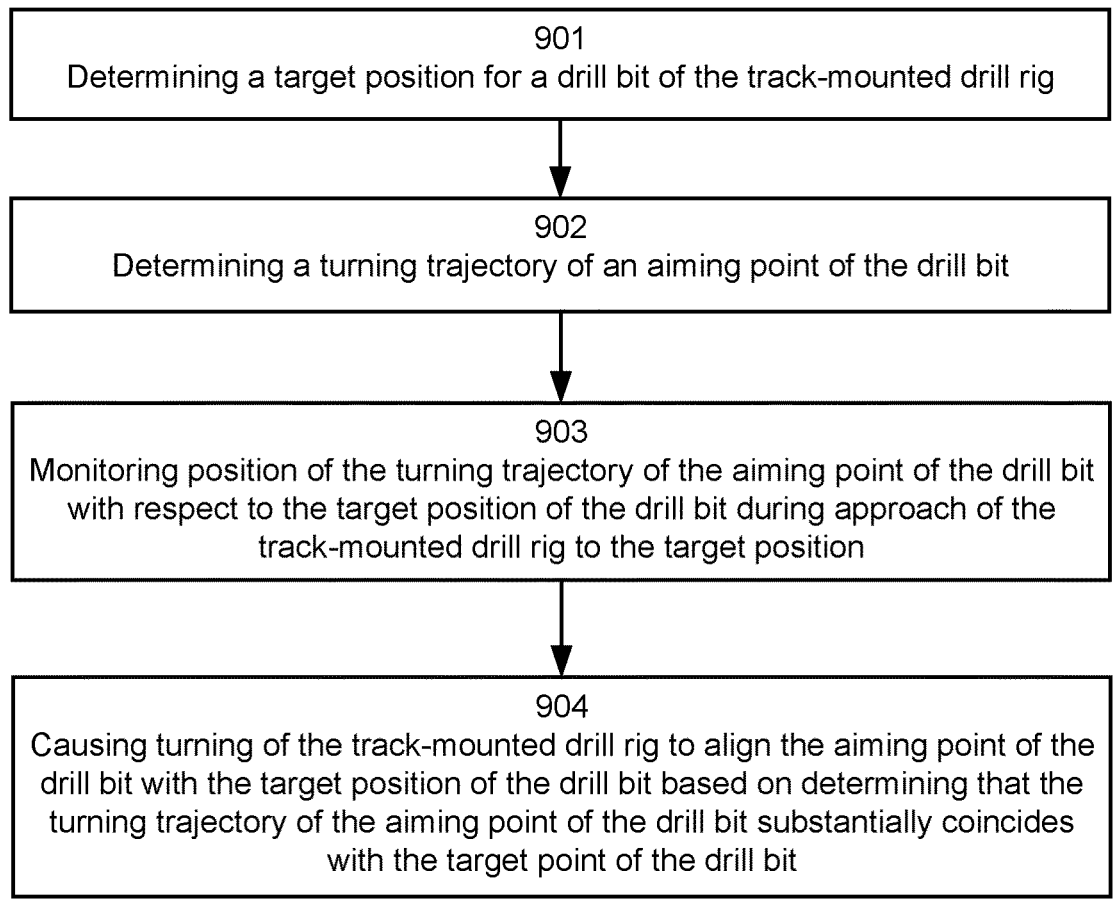
FIG. 9 illustrates an example of a method for controlling a track-mounted drill rig.

FIG. 9 illustrates an example of a method for controlling a track-mounted drill rig, according to a third aspect of the present disclosure. The method may comprise a computer-implemented method performed by, for example, apparatus 800 such as controller 112.

At 901, the method may comprise determining a target position for a drill bit of the track-mounted drill rig.

At 902, the method may comprise determining a turning trajectory of an aiming point of the drill bit.

At 903, the method may comprise monitoring position of the turning trajectory of the aiming point of the drill bit with respect to the target position of the drill bit during approach of the track-mounted drill rig to the target position.

At 904, the method may comprise causing turning of the track-mounted drill rig to align the aiming point of the drill bit with the target position of the drill bit based on determining that the turning trajectory of the aiming point of the drill bit substantially coincides with the target position of the drill bit.

According to an example embodiment of the third aspect, the method comprises: causing the turning of the track-mounted drill rig to align the aiming point of the drill bit with the target position of the drill bit, in response to terminating the approach of the track-mounted drill rig to the target position, or causing the turning of the track-mounted drill rig to align the aiming point of the drill bit with the target position of the drill bit, in response to receiving a user input configured to trigger alignment of the aiming point of the drill bit with the target position of the drill bit.

According to an example embodiment of the third aspect, the turning trajectory of the aiming point of the drill bit is relative to a current position of the track-mounted drill rig and associated with potential turning of the track-mounted drill rig at or from the current position of the track-mounted drill rig.

According to an example embodiment of the third aspect, the method comprises: determining a pivot point of the track-mounted drill rig; and determining the turning trajectory of the aiming point of the drill bit based on the pivot point of the track-mounted drill rig and a distance between the aiming point of the drill bit and the pivot point of the track-mounted drill rig, wherein the turning trajectory comprises at least part of a rotational circle of the aiming point of the drill rig.

According to an example embodiment of the third aspect, the method comprises: determining a pivot point of the track-mounted drill rig; and determining the turning trajectory of the aiming point of the drill bit based on the pivot point of the track-mounted drill rig, a relative position of the aiming point of the drill bit with respect to the pivot point of the track-mounted drill rig, and a calculated movement of the pivot point of the track-mounted drill rig associated with the potential turning of the track-mounted drill rig.

According to an example embodiment of the third aspect, the method comprises: determining a heading of the track-mounted drill rig, wherein the heading of the track-mounted drill rig comprises a heading subsequent to the turning of the track-mounted drill rig or a heading determined to be caused by the turning of the track-mounted drill rig; and in response to determining that the heading of the track-mounted drill rig does not correspond to a direction of an inclined hole planned to be drilled at the target position of the drill bit: causing tramming of the track-mounted drill rig to align the pivot point of the track-mounted drill rig in line with the target position of the drill bit in the direction of the inclined hole, causing turning of the track-mounted drill rig to align the heading of the track-mounted drill rig with the direction of the inclined hole, and causing tramming of the track-mounted drill rig, without turning the track-mounted drill rig, to align the aiming point of the drill bit with the target position of the drill bit.

According to an example embodiment of the third aspect, the target position of the drill bit comprises a target position of the drill bit on, or relative to, a drilling surface.

According to an example embodiment of the third aspect, the direction of the inclined hole comprises a direction of a projection of the inclined hole to the drilling surface.

According to an example embodiment of the third aspect, the aiming point of the drill bit comprises an aiming point of the drill bit on, or relative to, the drilling surface.

According to an example embodiment of the third aspect, the method comprises: determining the target position for the drill bit based on a drilling plan configured to indicate planned starting positions of a plurality of holes planned to be drilled on the drilling surface.

According to an example embodiment of the third aspect, the method comprises: causing the track-mounted drill rig to initiate drilling at the aiming point of the drill bit.

According to an example embodiment of the third aspect, the method comprises: determining a next target position for the drill bit; causing turning of the track-mounted drill rig towards the next target position of the drill bit, in response to terminating the drilling at the aiming point of the drill bit; and causing tramming of the track-mounted drill rig towards the next target position of the drill bit, in response to completing the turning of the track-mounted drill rig towards the next target position.

According to an example embodiment of the third aspect, the method is performed by an apparatus external to the track-mounted drill rig and configured to remotely control the track-mounted drill rig.

According to an example embodiment of the third aspect, the method is performed by the track-mounted drill rig.

According to a fourth aspect, an apparatus may comprise means for determining a target position for a drill bit of the track-mounted drill rig; means for determining a turning trajectory of an aiming point of the drill bit; means for monitoring position of the turning trajectory of the aiming point of the drill bit with respect to the target position of the drill bit during approach of the track-mounted drill rig to the target position; and means for causing turning of the track-mounted drill rig to align the aiming point of the drill bit with the target position of the drill bit based on determining that the turning trajectory of the aiming point of the drill bit substantially coincides with the target position of the drill bit. The apparatus may comprise means for performing any example embodiment(s) of the method of the third aspect.

According to a fifth aspect, a computer program, a computer program product, or a (non-transitory) computer-readable medium may comprise program instructions which, when executed by an apparatus, cause the apparatus at least to: determine a target position for a drill bit of the track-mounted drill rig; determine a turning trajectory of an aiming point of the drill bit; monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit. The computer program, the computer program product, or the (non-transitory) computer-readable medium may comprise program instructions which, when executed by an apparatus, cause the apparatus to perform any example embodiment(s) of the method of the third aspect.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. Term "or" may be understood to also cover a case where both of the items separated by "or" are included. Hence, "or" may be understood as an inclusive "or" rather than an exclusive "or".

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. An apparatus for controlling a track-mounted drill rig, the apparatus comprising:
    at least one processor; and
    at least one memory including computer program code, the at least one memory and the computer program code configured to, with the at least one processor, cause the apparatus at least to:
    determine a target position for a drill bit of the track-mounted drill rig;

determine a turning trajectory of an aiming point of the drill bit;

monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

2. The apparatus according to claim 1, wherein the computer program code is further configured to, with the at least one processor, cause the apparatus to:

cause the turning of the track-mounted drill rig to align the aiming point of the drill bit with the target position of the drill bit, in response to terminating the approach of the track-mounted drill rig to the target position, or cause the turning of the track-mounted drill rig to align the aiming point of the drill bit with the target position of the drill bit, in response to receiving a user input configured to trigger alignment of the aiming point of the drill bit with the target position of the drill bit.

3. The apparatus according to claim 2, wherein the turning trajectory of the aiming point of the drill bit is relative to a current position of the track-mounted drill rig and associated with potential turning of the track-mounted drill rig at or from the current position of the track-mounted drill rig.

4. The apparatus according to claim 3, wherein the computer program code is further configured to, with the at least one processor, cause the apparatus to:

determine a pivot point of the track-mounted drill rig; and determine the turning trajectory of the aiming point of the drill bit based on the pivot point of the track-mounted drill rig and a distance between the aiming point of the drill bit and the pivot point of the track-mounted drill rig, wherein the turning trajectory comprises at least part of a rotational circle of the aiming point of the drill rig.

5. The apparatus according to claim 3, wherein the computer program code is further configured to, with the at least one processor, cause the apparatus to:

determine a pivot point of the track-mounted drill rig; and determine the turning trajectory of the aiming point of the drill bit based on the pivot point of the track-mounted drill rig, a relative position of the aiming point of the drill bit with respect to the pivot point of the track-mounted drill rig, and a calculated movement of the pivot point of the track-mounted drill rig associated with the potential turning of the track-mounted drill rig.

6. The apparatus according to claim 3, wherein the computer program code is further configured to, with the at least one processor, cause the apparatus to:

determine a heading of the track-mounted drill rig, wherein the heading of the track-mounted drill rig comprises a heading subsequent to the turning of the track-mounted drill rig or a heading determined to be caused by the turning of the track-mounted drill rig; and in response to determining that the heading of the track-mounted drill rig does not correspond to a direction of an inclined hole planned to be drilled at the target position of the drill bit:

cause tramming of the track-mounted drill rig to align the pivot point of the track-mounted drill rig in line with the target position of the drill bit in the direction of the inclined hole, cause turning of the track-mounted drill rig to align the heading of the track-mounted drill rig with the direction of the inclined hole, and cause tramming of the track-mounted drill rig, without turning the track-mounted drill rig, to align the aiming point of the drill bit with the target position of the drill bit.

7. The apparatus according to claim 6, wherein the direction of the inclined hole comprises a direction of a projection of the inclined hole to a drilling surface.

8. The apparatus according to claim 1, wherein the target position of the drill bit comprises a target position of the drill bit on, or relative to, a drilling surface.

9. The apparatus according to claim 8, wherein the aiming point of the drill bit comprises an aiming point of the drill bit on, or relative to, the drilling surface.

10. The apparatus according to claim 8, wherein the computer program code is further configured to, with the at least one processor, cause the apparatus to:

determine the target position for the drill bit based on a drilling plan configured to indicate planned starting positions of a plurality of holes planned to be drilled on the drilling surface.

11. The apparatus according to claim 1, wherein the computer program code is further configured to, with the at least one processor, cause the apparatus to:

cause the track-mounted drill rig to initiate drilling at the aiming point of the drill bit.

12. The apparatus according to claim 11, wherein the computer program code is further configured to, with the at least one processor, cause the apparatus to:

determine a next target position for the drill bit;

cause turning of the track-mounted drill rig towards the next target position of the drill bit, in response to terminating the drilling at the aiming point of the drill bit; and cause tramming of the track-mounted drill rig towards the next target position of the drill bit, in response to completing the turning of the track-mounted drill rig towards the next target position.

13. The apparatus according to claim 1, wherein the apparatus is external to the track-mounted drill rig and configured to remotely control the track-mounted drill rig.

14. A track-mounted drill rig comprising the apparatus according to claim 1.

15. A method for controlling a track-mounted drill rig, the method comprising:

determining a target position for a drill bit of the track-mounted drill rig;

determining a turning trajectory of an aiming point of the drill bit;

monitoring position of the turning trajectory of the aiming point of the drill bit with respect to the target position of the drill bit during approach of the track-mounted drill rig to the target position; and causing turning of the track-mounted drill rig to align the aiming point of the drill bit with the target position of the drill bit based on determining that the turning trajectory of the aiming point of the drill bit substantially coincides with the target point of the drill bit.

16. A computer program comprising program instructions which, when executed by an apparatus, cause the apparatus at least to:

determine a target position for a drill bit of the track-mounted drill rig;

determine a turning trajectory of an aiming point of the drill bit;

monitor position of the turning trajectory of the aiming point of the drill bit with respect to the target position of the drill bit during approach of the track-mounted drill rig to the target position; and cause turning of the track-mounted drill rig to align the aiming point of the drill bit with the target position of the drill bit based on determining that the turning trajectory of the aiming point of the drill bit substantially coincides with the target position of the drill bit.

* * * * *